March 23, 1965   L. F. GOYKE   3,174,890
METHODS OF PREPARING SURGICAL CANNULA
Filed July 10, 1961
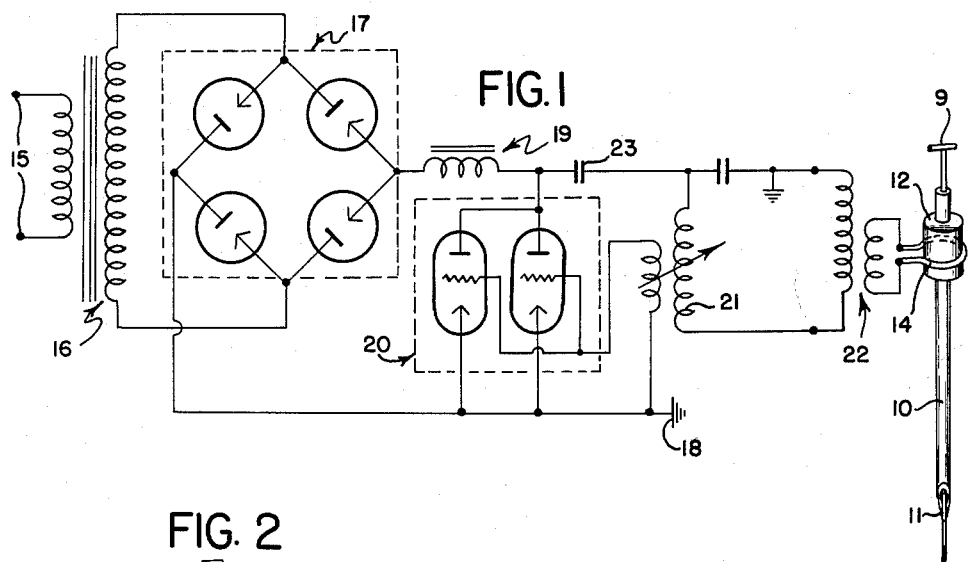
FIG. 1
FIG. 2
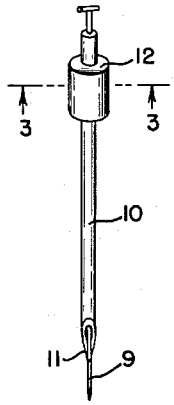
FIG. 3
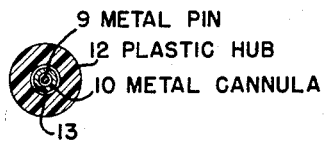
9 METAL PIN
12 PLASTIC HUB
10 METAL CANNULA
INVENTOR.
LEONARD F. GOYKE
BY Thad F Kryphok
ATTORNEY

United States Patent Office 3,174,890
Patented Mar. 23, 1965

3,174,890
METHODS OF PREPARING SURGICAL CANNULA
Leonard F. Goyke, Chicago, Ill., assignor to Baxter Laboratories, Inc., Morton Grove, Ill., a corporation of Delaware
Filed July 10, 1961, Ser. No. 122,977
2 Claims. (Cl. 156—272)

The present invention relates to the manufacture of parenteral and hypodermic needles or puncturing cannula and the like. More particularly it relates to an improved method of bonding pointed metal cannula within plastic manipulating hubs.

In the past, a wide variety of methods have been employed in an effort to develop a satisfactory method of affixing metal cannulae such as needles suitable for hypodermic or varied parenteral use within plastic as opposed to metal hubs. Such methods as gluing the metal cannulae within a preformed plastic hub or forcing the plastic hub onto the metal cannula have not always produced satisfactory end products and have proven excessively expensive and time consuming.

It is now, therefore, an object of the present invention to disclose a fast, inexpensive method of efficiently bonding metal cannula within plastic hubs. It is a further object of the present invention to disclose a method of preparing inexpensive hypodermic and parenteral needles and the like. It is still further an object of the present invention to disclose a novel method of directly bonding metal cannula within plastic hubs. This and still other objects of the present invention will be apparent as the specification proceeds.

It has now been discovered that superior hypodermic and parenteral needles and cannula may be prepared by a novel method which comprises positioning the combination of a pointed metal cannula and an overriding thermoplastic hub axially about a metal pin of high magnetic permeability; placing the thus formed new combination within the working coil of an induction heater; then sufficiently inductively heating the combination whereby the metal pin of high magnetic permeability is rapidly inductively heated, the metal cannula is both inductively and conductively heated, the latter by contact with said metal pin, and the surface of the thermoplastic hub in contact with the pointed metal cannula is melted by heat conducted from said cannula; and finally allowing the combination to cool whereby the melted plastic hardens to lock the cannula securely within the plastic hub. The metal pin may be either removed immediately after the induction heating step or retained in place until the cannula and hub combination is cooled.

The invention is shown in an illustrative embodiment by the accompanying drawing in which:

FIGURE 1 is a schematic view of the apparatus used in the inventive process.

FIGURE 2 is an elevation view of the combination of the metal cannula and the plastic hub and the metal pin.

FIGURE 3 is a cross sectional view of the metal cannula and overriding plastic hub and pin combination taken as indicated at line 3—3 of FIGURE 2.

In the illustration 9 designates a metal pin of high magnetic permeability, and 10 designates a metal cannula provided at one end with a point 11. At an intermediate point along the cannula 10 and preferably adjacent its opposite end is placed the overriding plastic hub 12. The plastic hub 12 has a central longitudinally extending orifice 13 (seen in FIGURE 3 only) which allows it to closely fit over and slide along cannula 10. The combination of the cannula 10 and the plastic hub 12 are positioned axially about the elongated metal pin 9.

In the preferred exercise of the present invention the thus described combination of the metal pin and the steel cannula 10 with a close fitting thermoplastic hub 12 in position is placed within the working coil 14 of an induction heating apparatus, such as for example (as shown in FIGURE 1) a 200 to 500 kilocycle vacuum tube oscillator or generator with a ¾ kilowatt output. The current is then caused to flow through the induction apparatus. The temperature of the metal pin of high magnetic permeability located with the induction coil is sufficiently raised by the transfer to the pin of electrical energy from the high-frequency current-carrying working coil 14 to heat the cannula 10 sufficiently to melt only the innermost surface of the overriding plastic hub but not to affect the external shape of the hub. To accomplish this generally requires 1½ to 6 seconds for the combination of a knurled 15 gauge steel needle having a magnetic permeability less than 1.02 mu, a stainless steel pin having a magnetic permeability of 1.15 mu, and a close fitting acrylic resin hub in the above induction heating apparatus. When the combination is removed and allowed to cool the melted plastic which has flowed into contact with the cannula hardens to directly and securely bond the cannula within the hub. The metal pin, of course, either may be removed immediately after the inductive heating step or are retained in position until the cannula and hub combination has cooled. Retaining the pin in place until completion of the process prevents any cannula and hub combinations with passageways blocked by plastic from escaping detection.

The induction heating coil raises the temperature of the metal pin without directly affecting the plastic of the hub by transferring electrical energy to the pin in the following manner. The heating coil, energized by a suitable power source, sets up a field of magnetic flux that energizes the metal pin but not the plastic hub in such a way that current is caused to flow around its surface. The resistance of the metal pin to this flow causes an immediate heating action to take place. It is, of course, this immediate heating action that makes it possible to heat the metal cannula sufficiently to melt the inner surface of the plastic hub without distorting the external shape of the hub.

The foregoing discussion was specifically directed to the mechanism which is present when metal cannula of no or very low magnetic permeability are utilized. With cannula of higher magnetic permeability some degree of induction heating of cannula itself occurs inductively. Nevertheless, the use of the metal pin offers advantage, even in such instances as it provides a greater mass of highly magnetically permeable material thereby significantly speeding the time required for the process. Furthermore the use of the pin as previously mentioned insures against the finished cannula and hub combination with plastic blocked passageways escaping protection.

A schematic representation of a vacuum tube type generator having an operating frequency of 375 kilocycles for carrying out the invention is illustrated in FIGURE 1. In operation alternating current at line voltage is fed through a main contactor 15 to a plate type input transformer 16. This transformer raises the power line voltage to approximately 9,000 volts, which is then applied to a four-tube, full-wave, bridge-type rectifier circuit 17 converting the alternating current to pulsating direct current. The negative lead from the rectifier is attached to a ground 18, and the positive, or high-voltage terminal is fed through a choke and a bypass condenser 19 to the oscillator section 20. High voltage is applied to the plates of the oscillator tubes, the filaments of which are grounded through a center tap on the filament transformer. This connection applies the 9,000 volts average between the plate and filament of the tube. The oscillatory circuit consists of an oil-filled tank capacitor and an inductance 21 which is divided into two sections. Part of this inductance is contained within the generator and is used for driving the grids of the tubes. The balance of the inductance is external, in the form of a radio-frequency output transformer 22 and work-coil 14 combination. The plates of the oscillator tubes are connected to the tank circuit through a plate-blocking condenser 23 to prevent direct current from going into the tank oscillatory circuit.

Operation of the oscillator circuit causes current to be circulated in the primary of the output transformer. The secondary of the transformer is a coupling means which permits energy to be extracted from the tank circuit without direct electrical connection and permits the circulation of a high frequency current in the work coil at low voltage. This arrangement is particularly desirable as it permits the operation to be performed with a heavy single-turn coil at a voltage so low that an operator may touch the coils while in operation.

It should be noted that in addition to the induction heating apparatus described there are many other types of induction heating apparatus which may be used. A large number of such devices are described in detail by Curtis in his book "High Frequency Induction Heating." Second Edition published by McGraw-Hill.

In accordance with the present invention a wide variety of thermoplastic materials may be employed to form the hub. Polyethylene, polypropylene, polyvinyl chloride and nylon are, of course, only representative of such materials. The cannula receiving orifice of the hub is preferably of only a very slightly greater diameter than the outer diameter of the cannula thereby allowing the cannula to be inserted quite easily but not to fit loosely.

The pointed metal cannula which may be utilized in practice of the present invention may as previously indicated vary in magnetic permeability considerably. Generally, however, the cannula stock purchased from a single source possesses a relatively constant magnetic permeability so that extremely wide ranges of permeability are not encountered. Usually sand blasting, knurling or otherwise roughing the surface of the cannula which is to contact the inner surface of the plastic hub aids in forming a particularly secure bond of plastic and metal.

The metal pin for use in the present invention may be formed of any material of high magnetic permeability such as iron or certain stainless steels and the like. A relatively simple way of determining the magnetic permeability of such a material to determine if it is suitable is to insert it in the working coil of an induction heater and determine the length of time required for it to heat to a specified temperature. Metal pins of different degrees of magnetic permeability may be preferred for use with hubs of various plastic materials. For example, with a 15 gauge stainless steel cannula having a magnetic permeability of less than 1.02 mu, and a modified acrylic resin hub, a stainless steel pin of a magnetic permeability of greater than 1.15 mu is generally preferred. The length of the pin and its outside dimension, of course, will vary with the cannula used. Generally it is preferred to use a pin which fits closely but not frictionally within the cannula thus preventing any scratches or irregularities from being produced upon the inner surface of the cannula. This is especially important where the finished product is intended as a phlebotomy needle and requires a hemo-repellent coated inner surface.

It will, of course, be understood that a certain degree of trial testing is desirable to determine the proper length of time to retain a specified metal pin, plastic hub and cannula combination within the heating coil. Time variations due to such variants as the magnetic permeability of the metal pin and the metal cannula and the melting point of the plastic hub are most conveniently compensated in this manner. With the same pin and cannula, the higher melting plastics such as nylon will generally require longer exposure to melt the inner surface of the hub but also allow for a greater margin of safety in preventing distortion of the external surface of the hub. With the lower melting plastics and a pin and cannula of high magnetic permeability it may prove advantageous to utilize a holder of plastic such as polyethylene, vinyl or nylon or the like to allow for a greater margin of safety without hub distortion. Such a holder may simply comprise a sheath which fits up over the pointed end of the cannula and conforms in shape to the lower end of the hub.

It will be understood, of course, that in commercial embodiments of the present invention such methods as suspending a working coil over a turntable or conveyor may be employed if so desired to eliminate individual handling of the combination.

It will be readily apparent that by exercise of the present invention a wide variety of metal tubes especially metal cannula of no or lower magnetic permeability may be for the first time directly bonded within plastic hubs without using glues, flux or the like. Therefore, the present invention provides a convenient, economical method of preparing inexpensive hypodermic and parenteral needles, airway cannula and the like.

It should likewise be understood that a wide variety of changes may be made without departing from the spirit and scope of the present invention.

The embodiments of the invention in which an exclusive property or privilege is claimed are as follows:

1. The method of preparing surgical cannula which comprises positioning a closefitting overriding plastic hub formed of a thermoplastic resonous material about a length of pointed hollow cannula tubing, placing the combination of the hub and tubing axially about a metal pin of comparatively high magnetic permeability, inductively heating said combination so as to melt the inner surface of the plastic hub in immediate contact with the metal tubing and then allowing said combination of tubing and hub to cool thus hardening the plastic and binding the cannula to the hub.

2. The method of preparing surgical cannula which comprises selecting a length of pointed hollow metal tubing, positioning a preformed closefitting plastic hub formed of a thermoplastic resinous material upon said tubing, placing the combination of the hub and the tubing axially about a metal pin of comparatively high magnetic permeability, placing the thus formed combination within the coil of an induction heater, then inductively heating said combination to melt the surface of the plastic hub in immediate contact with said tubing, and finally allowing the combination of the tubing and the hub to cool thus hardening the plastic and binding the cannula within the hub.

References Cited by the Examiner
UNITED STATES PATENTS

| | | | |
|---|---|---|---|
| 2,522,949 | 9/50 | Jarman | 219—10.53 |
| 2,702,037 | 2/55 | Walter | 128—221 |
| 2,814,707 | 11/57 | Turnbull et al. | 219—10.53 |

EARL M. BERGERT, *Primary Examiner.*

MAX L. LEVY, *Examiner.*